US012012951B2

(12) United States Patent
Bienick et al.

(10) Patent No.: US 12,012,951 B2
(45) Date of Patent: Jun. 18, 2024

(54) CONTROL APPARATUS AND METHOD FOR CONTROLLING A VOLUME FLOW OF A FLUID IN A DRIVE TRAIN OF A MOTOR VEHICLE

(71) Applicant: Brose Fahrzeugteile SE & Co. Kommanditgesellschaft, Würzburg, Würzburg (DE)

(72) Inventors: Christian Bienick, Gerbrunn (DE); Adarsha Kanchana, Estenfeld (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 557 days.

(21) Appl. No.: 17/352,999

(22) PCT Filed: Dec. 16, 2019

(86) PCT No.: PCT/EP2019/085295
§ 371 (c)(1),
(2) Date: Aug. 12, 2021

(87) PCT Pub. No.: WO2020/127007
PCT Pub. Date: Jun. 25, 2020

(65) Prior Publication Data
US 2023/0175500 A1    Jun. 8, 2023

(30) Foreign Application Priority Data

Dec. 19, 2018   (DE) ...................... 10 2018 222 364.5

(51) Int. Cl.
*F04B 49/06*    (2006.01)
*B60K 25/00*    (2006.01)
(Continued)

(52) U.S. Cl.
CPC ............ *F04B 49/065* (2013.01); *F04B 17/03* (2013.01); *G05D 17/02* (2013.01);
(Continued)

(58) Field of Classification Search
CPC ...... F04B 49/065; F04B 17/03; F04B 49/002; F04B 49/20; F04B 2203/0207;
(Continued)

(56) References Cited

U.S. PATENT DOCUMENTS

| 5,884,601 A | 3/1999 | Robinson |
| 2009/0220352 A1 | 9/2009 | Carstensen |

(Continued)

FOREIGN PATENT DOCUMENTS

| DE | 102012025227 A1 * | 6/2014 | ................ F04B 1/26 |
| DE | 102015207682 A1 | 10/2016 | |

(Continued)

OTHER PUBLICATIONS

DE102012025227 translation (Year: 2024).*
International Search Report dated Mar. 2, 2020 for PCT /EP2019/085295, 2 pages.

*Primary Examiner* — Charles G Freay
*Assistant Examiner* — David N Brandt
(74) *Attorney, Agent, or Firm* — Dickinson Wright PLLC

(57) ABSTRACT

A control device for regulating a volume flow of a fluid in a drive train of a motor vehicle includes a torque monitoring unit, set up to determine, on the basis of a characteristic diagram of the pump which describes a functional dependency of the torque to be applied by the drive motor on the rotational speed of the drive motor for a predetermined fluid state of the fluid, a current torque deviation occurring between the current torque and the torque given by the characteristic diagram for the current rotational speed, and a correction unit, set up to correct a power setting signal for (Continued)

the drive motor in accordance with the current torque deviation and to provide a corrected power setting signal, and a power regulation unit, set up to generate a second power setting signal for actuating the drive motor on the basis of the corrected power setting signal.

20 Claims, 1 Drawing Sheet

(51) Int. Cl.
*F04B 17/03* (2006.01)
*F04B 49/00* (2006.01)
*F04B 49/20* (2006.01)
*G05D 17/02* (2006.01)

(52) U.S. Cl.
CPC ....... *B60K 2025/005* (2013.01); *F04B 49/002* (2013.01); *F04B 49/20* (2013.01); *F04B 2203/0207* (2013.01); *F04B 2203/0209* (2013.01); *F04B 2205/09* (2013.01)

(58) Field of Classification Search
CPC ......... F04B 2203/0209; F04B 2205/09; B60K 25/00; B60K 2025/005; G05D 17/02
See application file for complete search history.

(56) References Cited

U.S. PATENT DOCUMENTS

2012/0251354 A1\* 10/2012 Kogure ................... F04B 17/03
  417/410.1
2016/0084724 A1\* 3/2016 Shibata ................. F04B 49/065
  417/44.2

FOREIGN PATENT DOCUMENTS

DE 102016216765 A1 6/2017
JP 2009-185915 A 8/2009

\* cited by examiner

CONTROL APPARATUS AND METHOD FOR CONTROLLING A VOLUME FLOW OF A FLUID IN A DRIVE TRAIN OF A MOTOR VEHICLE

CROSS-REFERENCE TO RELATED APPLICATIONS

This application is the U.S. National Phase of PCT Application No. PCT/EP2019/085295 Dec. 16, 2019, which claims priority to German Application No. 102018222364.5 filed Dec. 19, 2018, the disclosures of which are hereby incorporated in their entirety by reference herein.

TECHNICAL FIELD

The present invention relates to a control device and a method for regulating a volume flow of a fluid in a drive train of a motor vehicle and to a hydraulic conveying system for a motor vehicle.

BACKGROUND

In drive trains of motor vehicles, a hydraulic fluid is generally used for cooling and lubricating the mechanical components, and is conveyed by an electrically driven pump. So as to provide sufficient hydraulic fluid in different mechanical load states of the drive train, the volume flow of the hydraulic fluid can be varied. For this purpose, the drive motor of the pump is operated as a function of the various flow parameters of the hydraulic fluid. In this context, flow parameters of the hydraulic fluid are usually detected by sensors.

By way of example, U.S. Pat. No. 5,884,601 describes operating the electrical drive motor of a pump of a lubrication system for combustion engines as a function of a load state of the combustion engine and of a measured pressure of the lubricating oil. JP 2009185915 A describes regulation of the torque or rotational speed of a drive motor of an oil pump as a function of an oil temperature detected by a temperature sensor.

SUMMARY

This disclosure provides simple, robust regulation for a volume flow of a fluid in a drive train of a vehicle.

According to first aspect of the disclosure, a control device for regulating a volume flow of a fluid in a drive train of a motor vehicle includes a rotational speed specification input for receiving a target rotational speed signal representing a target rotational speed of a drive motor for driving a pump for conveying the fluid, a power output for connection to the drive motor, a rotational speed input for receiving a current rotational speed signal representing a current rotational speed of the drive motor, and a torque input for receiving a current torque signal representing a current torque of the drive motor. The inputs and outputs of the control device may be implemented, for example, as analogue or digital interfaces that are configured to transmit electrical or electromagnetic signals.

The control device further comprises a torque monitoring unit, configured to determine, on the basis of a characteristic diagram of the pump that describes a functional dependency of the torque to be applied by the drive motor on the rotational speed of the drive motor for a predetermined fluid state of the fluid, a current torque deviation occurring between the current torque and the torque given by the characteristic diagram for the current rotational speed, and to generate a torque deviation signal representing the current torque deviation.

The control device further has a rotational speed regulation unit, configured to generate, on the basis of the target rotational speed signal and the current rotational speed signal, a first power setting signal that represents a target torque of the drive motor. A target rotational speed is thus supplied to the rotational speed regulation unit as a guide variable, and a regulation deviation is determined with respect to the actual current rotational speed of the drive motor. The rotational speed regulation unit delivers a target torque as a setting variable.

A correction unit, configured to correct the first power setting signal in accordance with the torque deviation signal and to provide a corrected first power setting signal, and a power regulation unit, configured to generate a second power setting signal on the basis of the corrected first power setting signal and the current torque signal and to provide it at the power output to actuate the drive motor, are further provided. The correction unit may in particular be implemented as an addition unit, which adds the target torque delivered by the rotational speed regulation unit to the current torque deviation provided by the torque monitoring unit. The power regulation unit subsequently receives the corrected power setting signal, which represents the corrected target torque, as a guide variable, and the current torque of the drive motor in the form of the current torque signal as a measurement variable, and provides a setting signal for operating the drive motor as a setting variable, for example, in the form of an operating voltage or another suitable setting variable for influencing the torque of the drive motor.

The control device may be implemented by way of a processor and a memory, a microcontroller, or an FPGA (field-programmable gate array), or in some similar manner. The rotational speed regulation unit, the correction unit, the power regulation unit and the torque monitoring unit may in particular be programmed as software modules that may be executed by a processor.

A second aspect of the disclosure provides a hydraulic conveying system for a motor vehicle. The hydraulic conveying system comprises a conveying device, which has a pump and a drive motor kinematically coupled to the pump for driving the pump, a rotational speed detection unit for detecting a variable representing a current rotational speed of the drive motor and generating a current rotational speed signal representing a current rotational speed, a torque detection unit for detecting a variable representing a current torque of the drive motor and generating a current torque signal representing a current torque, and a control device according to the first aspect of the disclosure. The power output of the control device is connected to a power input of the drive motor. The rotational speed detection unit is connected to the rotational speed input of the control device. The torque detection unit is connected to the torque input.

A third aspect of the disclosure provides a method for regulating a volume flow of a fluid conveyed through a drive train of a motor vehicle by a pump driven by a drive motor. In the method, a current rotational speed of the drive motor is detected, a current torque of the drive motor is detected, and, on the basis of a characteristic diagram of the pump which describes a functional dependency of the torque to be applied by the drive motor on the rotational speed of the drive motor for a predetermined fluid state of the fluid, a current torque deviation between the detected current torque and the torque given by the characteristic diagram for the current rotational speed is determined. Further, a target torque of the drive motor is determined on the basis of a target rotational speed and the detected current rotational speed, the target torque is corrected in accordance with the detected current torque deviation, and the current torque of the drive motor is regulated to the corrected target torque.

An idea underlying the present disclosure is to regulate a volume flow of a fluid or hydraulic fluid, such as oil, by way of a rotational speed and torque of the drive motor, a current rotational speed and current torque of the drive motor being used as guide variables for the regulation. According to the one or more embodiments, the current torque is compared with a torque given by a characteristic diagram for the given current torque for a predetermined fluid state, in particular for a predetermined viscosity of the fluid. The characteristic diagram may, for example, be determined for the predetermined viscosity for the given pump and the given drive motor individually by measurement or adapted to the given pump and the given drive motor individually by targeted calibration. As a result, in the characteristic diagram, a torque and a fluid volume flow are assigned to each rotational speed for a given predetermined fluid state. If, when the current torque is compared, a deviation from the torque given by the characteristic diagram for the current rotational speed is found, it may be concluded from this that there is a deviation of the current volume flow from the target volume flow. As a result of the deviation, it may also be determined whether the viscosity of the fluid has changed, for example, because there are air bubbles in the fluid. This deviation is used to correct a setting variable, in the form of a target torque or a target torque change determined from a deviation of the current torque from the target torque, and to regulate the current torque of the drive motor to the corrected target torque.

An advantage according to one or more embodiments is that by detecting operating variables of the drive motor the fluid volume flow or the drive motor may be regulated without measuring the volume flow itself. This reduces the error susceptibility of the regulation and reduces the installation and maintenance costs of the regulation. By comparing the current torque with an "ideal torque" given by the characteristic diagram for the given current torque, closed regulation is additionally implemented, which takes into account the viscosity of the hydraulic fluid. In particular, the proportional relationship, assumed for rotational-speed-guided systems, between pump rotation speed and conveyed fluid volume flow is converted more realistically by matching the torque against the characteristic diagram. This improves the accuracy of the regulation.

Advantageous embodiments and developments may be derived from the description with reference to the drawings.

One embodiment of the control device provides that it has a fluid state input for receiving a fluid state signal representing a thermodynamic state variable of the fluid, the functional relationship of the characteristic diagram taking into account the thermodynamic state variable of the fluid as a predetermined fluid state. The thermodynamic state variable may be the temperature or pressure of the hydraulic fluid. Thus, in the characteristic diagram, a torque is assigned to each rotational speed for a given fluid state, for example for a given temperature. This further improves the accuracy of the regulation, since changes in the viscosity of the fluid which result from a fluid state change, for example a change in temperature, are taken into account in determining the current torque deviation by way of the characteristic diagram.

In a further embodiment, the rotational speed regulation unit may be implemented as a PI controller.

In a further embodiment, the power regulation unit may have a controller, which may for example be implemented as a PI controller. Further, the power regulation unit may additionally have a modulator for modulating the second power setting signal.

PI controllers may be simpler to implement in software and have favourable behaviour over time.

A further embodiment of the control device provides that the control device has a state report output, the torque monitoring unit being configured to generate a state report signal and provide it at the state report output when the current torque deviation for the current rotational speed reaches a predetermined threshold. As stated previously, a deviation of the current torque from the state given by the characteristic diagram for the given current rotational speed and if applicable for the given determined thermodynamic fluid state indicates that the viscosity of the fluid is deviating from a predetermined state that forms a basis for the creation of the characteristic diagram. This means that if, for example, there is a high air content in the fluid this may be detected by way of the current torque deviation. Therefore, for example, cavitating operation of the pump can be detected and a corresponding warning signal may be provided at the state report output as a state report signal.

One embodiment of the hydraulic conveying system provides that the drive motor is an electric motor. In this case, the armature current, by way of example, may serve as a setting variable for the torque and/or as a current torque signal representing a measurement variable or the torque.

In a further embodiment of the hydraulic conveying system, the control device has, as described above, a fluid state input for receiving a fluid state signal representing a thermodynamic state variable of the fluid, and the functional relationship of the characteristic diagram takes into account the thermodynamic state variable of the fluid as a predetermined fluid state. The hydraulic conveying system further comprises a temperature sensor for detecting a temperature of the fluid, the temperature sensor being connected to the fluid state input of the control device. Accordingly, the temperature of the fluid detected by a temperature sensor is used as a fluid state variable.

One embodiment of the method provides that a current fluid state in the form of a thermodynamic state variable of the fluid is detected, for example as described above by way of a temperature sensor or by way of a pressure sensor, the functional relationship of the characteristic diagram taking into account the thermodynamic state variable of the fluid as a predetermined fluid state, and the current torque deviation for the detected current fluid state being determined. As was also shown previously, this improves the accuracy of the regulation.

The above configurations and developments may, where reasonable, be combined with one another. Further possible configurations, developments and implementations of the invention also include combinations not explicitly mentioned of features of the invention which are described above or below in relation to the embodiments.

BRIEF DESCRIPTION OF THE DRAWINGS

In the following, the present invention is described in greater detail with reference to the embodiments set out in the schematic drawings, in which.

Figure 1:
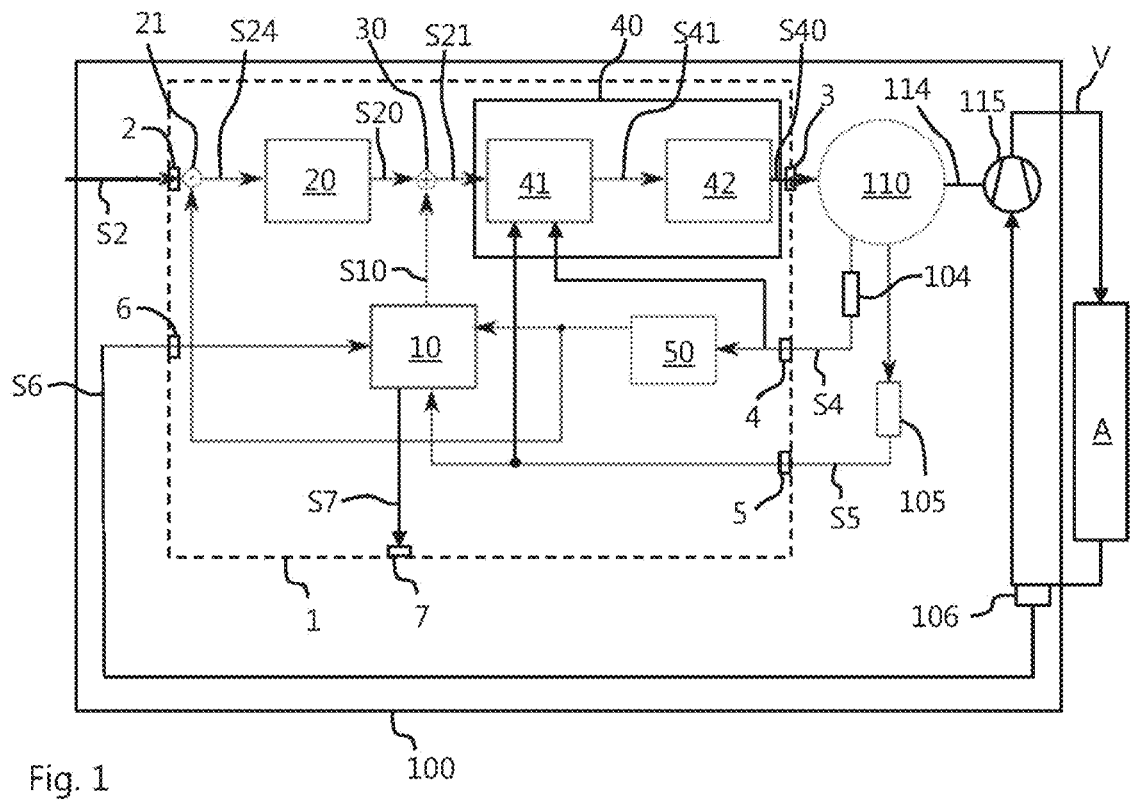
FIG. 1 is a schematic block diagram of a hydraulic conveying system in accordance with an embodiment of the present invention.

The accompanying drawings are intended to provide further understanding of the embodiments of the invention. They illustrate embodiments and serve, in connection with the description, to explain principles and concepts of the invention. Other embodiments and many of the stated advantages are apparent from the drawings. The elements of the drawings are not necessarily shown to scale with one another.

In the drawings, like, functionally equivalent and equivalently operating elements, features and components are provided with like reference numerals unless stated otherwise.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 is an exemplary schematic block diagram of a hydraulic conveying system 100 for a motor vehicle. The hydraulic conveying system 100 has a conveying device comprising a pump 115 and a drive motor 110, a rotational speed detection unit 104, a torque detecting unit 105, an optional temperature sensor 106 and a control device 1.

As is schematically shown in FIG. 1, the pump 115 serves to convey a fluid, for example oil, through a drive train A of a motor vehicle, for example to cool and/or lubricate mechanical components of the drive train A. The drive motor 110, which can be implemented for example as an electric motor, is kinematically coupled to the pump 115, for example by a drive shaft 114, as is schematically shown in FIG. 1.

A fluid volume flow V conveyed by the pump 115 is dependent on the rotational speed of the pump 115 and thus on a rotational speed of the drive motor 110. Further, the volume flow V conveyed at a particular rotational speed of the pump 115 or of the drive motor 110 is dependent on the viscosity and a proportion by volume of gas bubbles present in the fluid. The viscosity of the fluid depends predominantly on the temperature of the fluid. So as to convey a predetermined volume flow V, in which there are no gas bubbles, at a predetermined temperature, an appropriate rotational speed of the pump 115 can be provided by the drive motor 110 in accordance with the dependency of the volume flow V on the rotational speed of the pump 115. In this case, a particular torque is required for this purpose, and is provided by the drive motor 110.

Figure 2:
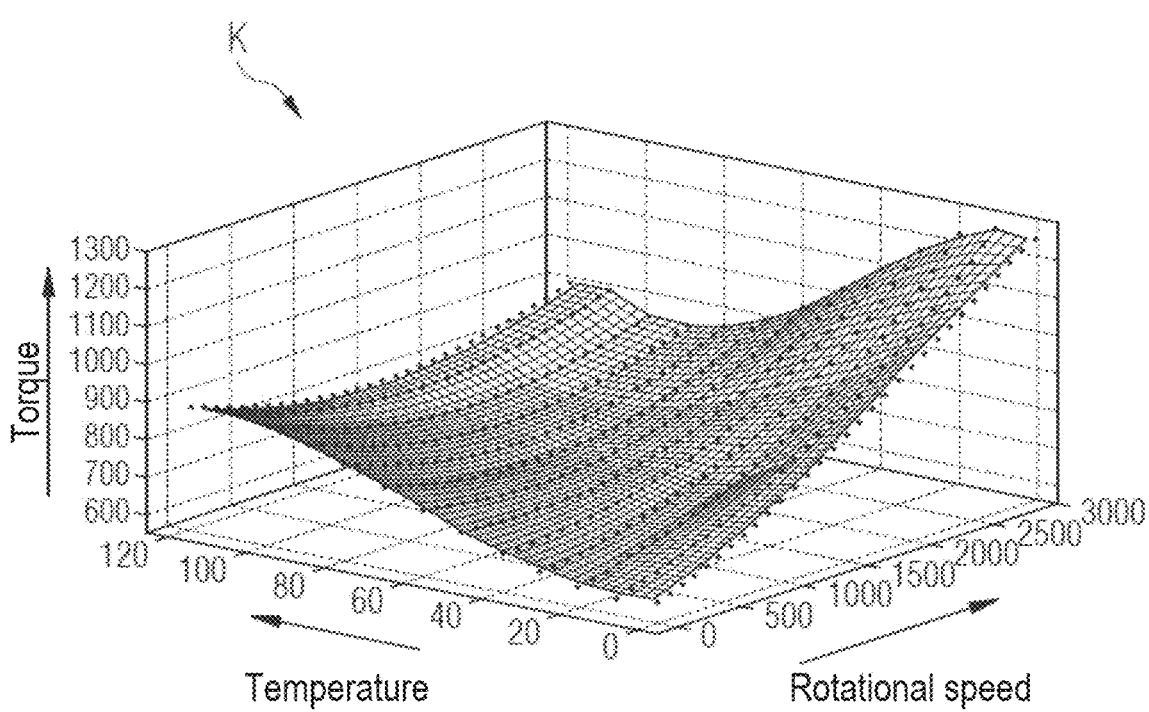
FIG. 2 is a characteristic diagram for implementation in a torque monitoring unit of a control device in accordance with an embodiment of the present invention.

FIG. 2 is an exemplary characteristic diagram K which describes a functional relationship, for an example pump 115, between the rotational speed of the drive motor 110 and the torque of the drive motor 110 for a predetermined fluid state, in particular for a predetermined temperature of the fluid. In the exemplary characteristic diagram K of FIG. 2, the functional relationship is shown for a plurality of predetermined fluid states. The exemplary characteristic diagram of FIG. 2 thus describes a functional relationship between the rotational speed of the drive motor 110 and the torque of the drive motor 110 for a number of fluid temperatures.

The exemplary characteristic diagram K of FIG. 2 can be described mathematically as $$M_{req} = C \times \vec{T} \times \overrightarrow{Q(n)}$$

Here, $M_{req}$ is the torque to be applied by the drive motor. C describes a coefficient matrix displaying individual coefficients for a given pump. The vector T contains the fluid temperature. The matrix Q(n) describes the conveyed volume flow as a function of the rotational speed n. The dimension of the matrix $C_{(i,j)}$ is determined by the size of the temperature vector $T_{(i)}$ and the size of the volume flow $Q(n)_{(j)}$, which is dependent on the rotational speed, in such a way that multiplication gives a dimensionless scalar $M_{req}$. The scalar $M_{req}$ is incorporated into the regulation structure in the control device 1, as is described in greater detail in the following.

The optional temperature sensor 106 serves to detect a current temperature of the fluid. As is shown by way of example in FIG. 1, the temperature sensor 106 may be arranged downstream from the drive train A or between a fluid outlet of the drive train A and an inlet of the pump 115. The temperature sensor 106 is configured to generate a current temperature signal S6 representing the current temperature, for example in the form of an electrical voltage.

As is schematically shown in FIG. 1, the rotational speed detection unit 104 is functionally coupled to the drive motor 110 and serves to detect a current rotational speed of the drive motor 110. By way of example, the rotational detection unit 104 may be implemented as a rotational speed sensor or angle-of-rotation sensor. In general, the rotational speed detection unit 104 may be configured to detect, in a time-dependent manner, an angle of rotation of an armature of the drive motor 110, which is optionally configured as an electric motor. The rotational speed detection unit 105 may also be provided for example for detecting a rotational speed of the drive shaft 114. The rotational speed detection unit 104 is generally configured to generate a current rotational speed signal S4 representing the current rotational speed, for example in the form of a voltage progression over time.

As is further schematically shown in FIG. 1, the torque detection unit 105 is functionally coupled to the drive motor 110, and serves to detect a present current torque of the drive motor 110. For example, the torque detection unit 105 may be implemented as a current sensor for detecting an armature current, if the drive motor 110 is optionally configured as an electric motor. Alternatively, a torque sensor may be kinematically coupled to the drive shaft 114 and implemented as a strain gauge, as a piezo-element, or in some similar manner. Of course, it is also conceivable to determine the torque from electrical variables of the drive motor which are proportional to the armature current, if the drive motor 110 is optionally configured as an electric motor. Generally, the torque detection unit 105 is configured to detect a variable representing the current torque and to generate a current torque signal S5 which represents a current torque generated by the drive motor 110.

The control device 1 shown by way of example in FIG. 1 has a rotational speed specification input 2, a power output 3, a rotational speed input 4, a torque input 5, an optional fluid state input 6, and an optional state report output 7. The control device 1 further comprises a rotational speed regulation unit 20, a correction unit 30, a power regulation unit 40, and an optional rotational speed signal processing unit 50.

The control device 1 may have a computation unit (not shown) and a data memory (not shown). By way of example, the control device 1 may be implemented as a microcontroller or as an FPGA. Of course, it is also conceivable to implement the computation device as a processor, for example, as a CPU, separate from the data memory. The data memory may generally be a non-volatile data memory, for example a hard disk, a CD-ROM, a DVD, a diskette, a flash memory or the like. The rotational speed regulation unit 20, the correction unit 30, the power regulation unit 40 and the optional rotational speed signal processing unit 50 may each be programmed as a software module and stored on the data memory. The computation unit is configured to execute the software module.

The rotational speed specification input 2 is provided to receive a current rotational speed signal S2 representing a current rotational speed of the drive motor 110. For this purpose, the rotational speed specification input 2 may be connected to a rotational speed encoder (not shown) such as a superordinate control device. The rotational speed input 2 is configured for wired or wireless data communication. By way of example, the rotational speed specification input may be implemented as a CAN, USB, WIWI, Bluetooth, infrared or similar interface.

The power output 3 is provided for connection to the drive motor 110. In the hydraulic system 100 shown by way of example in FIG. 1, the power output 3 is connected to the drive motor 110. The power output 3 may be configured for wired or wireless data communication and be implemented for example as a CAN, USB, Wi-Fi, Bluetooth, infrared or similar interface. In this case, a power setting signal S40 provided at the power output 3 may be a signal which is further processed by a signal convertor (not shown) of the drive motor 110 so as to operate the drive motor 110 at a torque and/or rotational speed in accordance with the power setting signal S40. Alternatively, it is also conceivable for the power output 3 to be formed as an electrical or mechanical interface, the power setting signal S40 provided at the power output 3 being a setting variable, such as an operating voltage, which is used directly for operating the drive motor 110.

The rotational speed input 4 is provided to receive a current rotational speed signal S4 representing a current rotational speed of the drive motor 110. In the hydraulic system 100 shown by way of example in FIG. 1, the rotational speed input 4 is connected to the rotational speed detection unit 104, and receives a current rotational speed signal S4 therefrom, for example in the form of a time-dependent angle of rotation of the drive motor 110. The rotational speed input 4 may be configured for wired or wireless data communication and be implemented for example as a CAN, USB, Wi-Fi, Bluetooth, infrared or similar interface.

The torque input 5 is provided to receive a current torque signal S5 representing a current torque of the drive motor 110. In the hydraulic system 100 shown by way of example in FIG. 1, the torque input 5 is connected to the torque detection unit 105. The torque input 5 may be configured for wired or wireless data communication and be implemented for example as a CAN, USB, Wi-Fi, Bluetooth, infrared or similar interface.

The optional fluid state input 6 is provided to receive a fluid state signal S6 representing a thermodynamic state variable of the fluid. The fluid state signal S6 may, by way of example, be the signal generated by the optional temperature sensor 106, which represents a temperature of the fluid as a thermodynamic state variable. Other state variables, such as the pressure of the fluid, may also be used as a thermodynamic state variable. The fluid state input 6 may be configured for wired or wireless data communication and be implemented for example as a CAN, USB, Wi-Fi, Bluetooth, infrared or similar interface. In the hydraulic system 100 shown by way of example in FIG. 1, the fluid state input 6 is connected to the optional temperature sensor 106.

The optional state report output 7 serves to transmit state signals, for example warning signals, to external components, for example to a superordinate control system (not shown). The state report output 7 may be configured for wired or wireless data communication and be implemented for example as a CAN, USB, Wi-Fi, Bluetooth, infrared or similar interface.

The rotational speed signal processing unit 50, shown separate from the torque monitoring unit 10 in FIG. 1, may also be part of the torque monitoring unit 10. The torque signal processing unit 50 is connected to the rotational speed input 4, and may in particular be implemented as a differentiation unit. This means that the rotational speed signal processing unit 50 is configured to differentiate the current rotational speed signal S4 with respect to time, if the current rotational speed signal S4 corresponds to a progression of the angle of rotation over time, so as to obtain a value of the current rotational speed signal S4 corresponding to the actual current rotational speed.

The torque monitoring unit 10 contains the current rotational speed signal S4 and the current torque signal S5 and if applicable the optional fluid state signal S6 as input signals. As stated previously, the current rotational speed signal S4 represents a present current rotational speed of the drive motor 110. In the hydraulic conveying system 100 shown by way of example in FIG. 1, the fluid state signal S6 represents the temperature of the fluid, which is detected using the optional temperature sensor 106. The torque monitoring unit 10 is configured to determine, on the basis of the characteristic diagram K of the pump 115 as shown by way of example in FIG. 2, a torque from the characteristic diagram K for the fluid state determined by the fluid state signal S6 and the current rotational speed of the drive motor 110 determined by the rotational speed signal S4. This torque corresponds to an ideal torque which would need to be applied by the drive motor 110 at the current rotational speed so as to convey a volume flow V, in which there are no gas bubbles, at a volume flow corresponding to the current rotational speed. The characteristic diagram K may for example be stored in a data memory as a lookup table or in the form of a computation instruction executable by a processor or the like.

The torque monitoring unit 10 is further configured to determine a current torque deviation occurring between the current torque and the ideal torque given by the characteristic diagram K for the current rotational speed. Thus, if the torque detection unit 105 detects an actual current torque of the drive motor 110, represented as a current torque signal S5, which deviates from the ideal torque, for example being greater or smaller, a volume flow V is conveyed which deviates from the volume flow which would occur with the relationship underlying the characteristic diagram K between the rotational speed, fluid state and volume flow. This may for example be due to a proportion of gas bubbles in the fluid which arises during operation of the hydraulic system 100.

The torque monitoring unit 10 is configured to generate a torque deviation signal S10 representing the current torque deviation, for example in that appropriate software stored on a memory causes a processor or the like to generate the torque deviation signal S10.

Optionally, the torque monitoring unit 10 is configured to generate a state report signal S7 and provide it at the state report output 7 when the current torque deviation for the current rotational speed reaches a predetermined threshold. As explained previously above, the current torque deviation indicates the presence of gas bubbles in the fluid or is directly dependent on a gas content in the volume flow V. If a particular gas content in the volume flow V of the fluid is reached, there is the risk that the pump 115 will generate cavitation in the fluid. This can be detected by way of the current torque deviation. When the current torque deviation reaches or exceeds a predetermined threshold for the current rotational speed, in other words the current torque is much less than the ideal torque according to the characteristic diagram K for the given current rotational speed, the torque monitoring unit 10 generates a corresponding signal S7, which is provided at the state report output 7. The state report signal S7 may for example have a constant level, which merely indicates the presence of a current torque deviation above the threshold. The state report signal S7 is provided to a superordinate control system (not shown) for passing on.

The rotational speed regulation unit 20 contains, as input variables, the target rotational speed signal S2 provided at the rotational speed specification input 2 and the current rotational speed signal S4 provided at the rotational speed input 4 or by the optional rotational speed signal processing unit 50. As is shown by way of example in FIG. 1, a difference unit 21 may be provided, which is configured to determine a difference or deviation of the current rotational speed signal S4 from the target rotational speed signal S2 and to provide it as a rotational speed deviation signal S24. The difference unit 21 may also be part of the rotational speed regulation unit 20. The rotational speed regulation unit 20 is configured to generate, on the basis of the rotational speed deviation signal S24 or on the basis of the target rotational speed signal S2 and current rotational speed signal S4, a first power setting signal S20 representing a target torque of the drive motor 110. The rotational speed regulation unit 20 thus contains the target rotational speed, represented by the target rotational speed signal S2, as a guide variable, and the current rotational speed, represented by the current rotational speed signal S4, as a measurement variable, and outputs a target torque of the drive motor 110, represented by the first power setting signal S20, as a setting variable. The rotational speed regulation unit 20 may for example be implemented as a PI controller.

As is further schematically shown in FIG. 1, the first power setting signal S20 and the torque deviation signal S10 provided by the torque monitoring unit 10 are each supplied to the correction unit 30. The correction unit 30 may, as is shown by way of example in FIG. 1, be implemented as a separate addition unit or as part of the power regulation unit 40. The correction unit 30 is configured to correct the first power setting signal S20 in accordance with the torque deviation signal S10 and to provide a corrected first power setting signal S21. In the correction unit 30, the target torque, which would need to be set in accordance with the rotational speed regulation unit 10 at the drive motor 110, is thus increased or reduced by the current torque deviation, so as to be able to achieve or so as to approximate a volume flow V desired for the specified target rotational speed at the present gas bubble content.

The corrected first power setting signal S21 provided by the correction unit 30 is supplied to the power regulation unit 40 as a guide variable. The current torque or the current torque signal S4 representing the current torque is supplied to the power regulation unit 40 as a measurement variable, as is shown in FIG. 1 by way of example. The power regulation unit 40 is configured to generate a second power setting signal S40 as a setting variable, on the basis of the corrected first power setting signal S21 and the current torque signal S4, and to provide it at the power output 3 to actuate the drive motor 110. The second power setting signal S40 is supplied to the drive motor 110, as is shown schematically in FIG. 1, and as a result the power of the drive motor 110, and thus by way of the pump 115 the volume flow V, are varied accordingly.

FIG. 1 shows by way of example that the power regulation unit 40 has a regulator 41 and an optional modulator 42. The controller 41 may by way of example be implemented as a PI controller. The controller 41 contains the power setting signal S21, which represents the target torque of the drive motor 110, as a guide variable, and the current torque, as a current torque signal S5, as a measurement variable. If the drive motor 110 is implemented as an electric motor, the power setting signal S21 corresponds to a target current level. The current torque of the drive motor 110, represented by the current torque signal S5, corresponds to a current current level in this case. Further, in this case, the controller 41 may contain the angle of rotation of the armature of the drive motor 110, for example in the form of the current rotational speed signal S4. The controller 41 is configured to generate, as a setting variable, a setting signal S41 representing a suitable electrical setting variable, which is supplied to the modulator 42. The modulator 42 converts the continuous setting signal S41, for example an operating voltage, into a temporally discrete signal sequence consisting of individual pulses which correspond to the power setting signal S21. The time-dependent angle of rotation of the drive motor 110, which is detected as a current rotational speed signal S4, may be used for temporal synchronization of the generated power setting signal S41 or S40 with the angle of rotation of the drive motor 110.

A method for regulating a volume flow V of a fluid is described in the following by way of example with reference to the hydraulic system 100 shown in FIG. 1 or to the control device 1. It will be appreciated by a person skilled in the art that the features and advantages described in connection with the hydraulic system 100 or control device 1 also apply equivalently to the method and vice versa.

The fluid is conveyed through the drive train A, for example, the transmission of a motor vehicle, by the pump 115 driven by the drive motor 110. In a first step of the method, the current rotational speed of the drive motor 110 is detected, for example, by the rotational speed detection unit 104. Further, the current torque of the drive motor 110 is detected, for example, by the torque detection unit 105. Optionally, the temperature of the fluid is also detected, for example, by the temperature sensor 106.

In the method, on the basis of the characteristic diagram K of the pump 115, which describes the functional dependency of the torque to be applied by the drive motor 110 on the rotational speed of the drive motor 110 for a predetermined fluid state of the fluid, the current torque deviation between the detected current torque and the ideal torque given by the characteristic diagram K for the current rotational speed is determined. This can be done, for example, by the torque monitoring unit 10, which contains the detected current rotational speed in the form of the current rotational speed signal S4, the detected current torque as a current torque signal S5, and optionally the temperature of the fluid as a fluid state signal S6, as input variables. The temperature of the fluid may optionally be taken into account by way of the predetermined fluid state in the characteristic diagram K.

Further, a target torque of the drive motor 110 is determined on the basis of a target rotational speed and the detected current rotational speed, for example, by the rotational speed regulation unit 20, which contains the target rotational speed as a target rotational speed signal S2 and the current rotational speed as a current rotational speed signal S4.

The target torque is corrected in accordance with the determined current torque deviation, for example in the correction unit 30, as was explained above. Finally, the current torque of the drive motor 110 is regulated to the corrected target torque, for example by the power regulation unit 40.

Although the present invention has been described completely in the above by way of preferred embodiments, it is not limited thereto, but rather can be modified in various ways.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 Control device
2 Rotational speed specification input
3 Power output
4 Rotational speed input
5 Torque input
6 Fluid state input
7 State report output
10 Torque monitoring unit
20 Rotational speed regulation unit
21 Difference unit
30 Correction unit
40 Power regulation unit
41 Controller of power regulation unit
42 Modulator of power regulation unit
50 Rotational speed signal processing unit
100 Hydraulic conveying system
104 Rotational speed detection unit
105 Torque detection unit
106 Temperature sensor
110 Drive motor
114 Drive shaft
115 Pump
S2 Target rotational speed signal
S4 Current rotational speed signal
S5 Current torque signal
S6 Fluid state signal
S7 State report signal
S10 Torque deviation signal
S20 First power setting signal
S21 Corrected first power setting signal
S24 Rotational speed deviation signal S40 Second power setting signal
K Characteristic diagram
A Drive train
V Fluid volume flow While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation.

The invention claimed is:

1. A control device for regulating a volume flow of a fluid in a drive train of a motor vehicle, comprising: a rotational speed specification input for receiving a target rotational speed signal representing a target rotational speed of a drive motor for driving a pump for conveying the fluid; a power output connectable to the drive motor; a rotational speed input that receives a current rotational speed signal representing a current rotational speed of the drive motor; a torque input that receives a current torque signal representing a current torque of the drive motor; a torque monitoring unit configured to: determine, based on a characteristic diagram of the pump that describes a functional dependency between a torque to be applied by the drive motor and a rotational speed of the drive motor for a predetermined fluid state of the fluid, a current torque deviation occurring between the current torque and a torque given by the characteristic diagram for the current rotational speed, and generate a torque deviation signal representing the current torque deviation; a rotational speed regulation unit, configured to generate, based on the target rotational speed signal and the current rotational speed signal, a first power setting signal that represents a target torque of the drive motor; a correction unit, configured to correct the first power setting signal in accordance with the torque deviation signal and to provide a corrected first power setting signal; and a power regulation unit, configured to generate a second power setting signal based on the corrected first power setting signal and the current torque signal and to provide the second power setting signal at the power output to actuate the drive motor according to the second power setting signal.

2. The control device of claim 1, further comprising a fluid state input configured to receive a fluid state signal representing a thermodynamic state variable of the fluid, wherein the functional dependency of the characteristic diagram includes the thermodynamic state variable of the fluid as the predetermined fluid state.

3. The control device of claim 1, wherein the rotational speed regulation unit is implemented as a PI controller.

4. The control device of claim 1, wherein the power regulation unit has a PI controller.

5. The control device of claim 1 further comprising a state report output, wherein the torque monitoring unit is further configured to generate a state report signal at the state report output when the current torque deviation for the current rotational speed reaches a predetermined threshold.

6. A hydraulic conveying system for a motor vehicle comprising: a conveying device having a pump and a drive motor coupled to the pump; a rotational speed detection unit configured to detect a variable representing a current rotational speed of the drive motor; a torque detection unit configured to detect a variable representing a current torque of the drive motor; and a control device including: a rotational speed specification input for receiving a target rotational speed signal representing a target rotational speed of a drive motor for driving a pump for conveying a fluid; a power output for connection to the drive motor; a torque monitoring unit configured to (i) determine, based on a characteristic diagram of the pump that describes a functional dependency between a torque to be applied by the drive motor and a rotational speed of the drive motor for a predetermined fluid state of the fluid, a current torque deviation occurring between the current torque and a torque given by the characteristic diagram for a current rotational speed of the drive motor, and (ii) generate a torque deviation signal representing the current torque deviation; a rotational speed regulation unit configured to generate, based on the target rotational speed signal and the current rotational speed signal, a first power setting signal that represents a target torque of the drive motor; a correction unit configured to correct the first power setting signal in accordance with the torque deviation signal and to provide a corrected first power setting signal; and a power regulation unit configured to generate a second power setting signal based on of the corrected first power setting signal and the current torque signal and to provide the second power setting signal at the power output to actuate the drive motor according to the second power setting signal; wherein the power output of the control device is connected to a power input of the drive motor; wherein the rotational speed detection unit is connected to the rotational speed specification input of the control device; and wherein the torque detection unit is connected to a torque input of the control device.

7. The hydraulic conveying system of claim 6, wherein the drive motor is an electric motor.

8. The hydraulic conveying system of claim 6, wherein the control device further includes a fluid state input configured to receive a fluid state signal representing a thermodynamic state variable of the fluid, wherein the functional dependency of the characteristic diagram includes the thermodynamic state variable of the fluid as the predetermined fluid state, and further comprising a temperature sensor for detecting a temperature of the fluid, the temperature sensor being connected to the fluid state input of the control device.

9. The hydraulic conveying system of claim 6, wherein the control device further includes a fluid state input configured to receive a fluid state signal representing a thermodynamic state variable of the fluid, wherein the functional dependency of the characteristic diagram includes the thermodynamic state variable of the fluid as the predetermined fluid state.

10. The hydraulic conveying system of claim 6, wherein the rotational speed regulation unit is implemented as a PI controller.

11. The hydraulic conveying system of claim 6, wherein the power regulation unit has a PI controller.

12. The hydraulic conveying system of claim 6, further comprising a state report output, wherein the torque monitoring unit is further configured to generate a state report signal at the state report output when the current torque deviation for the current rotational speed reaches a predetermined threshold.

13. A method for regulating a volume flow of a fluid conveyed through a drive train of a motor vehicle by a pump driven by a drive motor, the method comprising: detecting a current rotational speed of the drive motor; detecting a current torque of the drive motor; determining, based on a characteristic diagram of the pump that describes a functional dependency between a torque to be applied by the drive motor and a rotational speed of the drive motor for a predetermined fluid state of the fluid, a current torque deviation between the detected current torque and a torque given by the characteristic diagram for the current rotational speed; determining a target torque of the drive motor based on a target rotational speed and the detected current rotational speed; correcting the target torque in accordance with the detected current torque deviation; and regulating the current torque of the drive motor to the corrected target torque.

14. The method of claim 13, further comprising detecting a thermodynamic state variable of the fluid, wherein a functional relationship of the characteristic diagram includes the thermodynamic state variable of the fluid as the predetermined fluid state, and the current torque deviation for a detected current fluid state being determined.

15. The method of claim 13 further comprising receiving a fluid state signal representing a thermodynamic state variable of the fluid, wherein the functional dependency of the characteristic diagram includes the thermodynamic state variable.

16. The method of claim 13 further comprising generating a state report signal when a difference between the current torque deviation and the current rotational speed exceeds a predetermined threshold.

17. The method of claim 13, wherein the current rotational speed of the drive motor is based on a signal from a speed sensor.

18. The method of claim 13, wherein the current torque of the drive motor is based on a signal from a torque detection unit.

19. The method of claim 13, wherein the current torque deviation is based on a temperature of the fluid.

20. The method of claim 13, wherein the target torque of the drive motor is further based on the target rotational speed and the detected current rotational speed.

* * * * *